(12) United States Patent
Matter et al.

(10) Patent No.: US 12,338,912 B2
(45) Date of Patent: Jun. 24, 2025

(54) VALVE ACTUATOR, VALVE ASSEMBLY AND METHOD

(71) Applicant: GEMÜ Gebr. Müller Apparatebau Gmbh & Co. Kommanditgesellschaft, Ingelfingen (DE)

(72) Inventors: Simon Matter, Ravenstein (DE); Philipp Bitter, Gosbach (DE); Sebastian Knoche, Öhringen (DE); Christian Falkenberger, Bad Mergentheim (DE); Jochen Falkenberger, Bad Mergentheim (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 341 days.

(21) Appl. No.: 17/882,955

(22) Filed: Aug. 8, 2022

(65) Prior Publication Data

US 2023/0053312 A1    Feb. 16, 2023

(30) Foreign Application Priority Data

Aug. 11, 2021  (DE) .................. 10 2021 120 895.5

(51) Int. Cl.
   *F16K 31/122*   (2006.01)
(52) U.S. Cl.
   CPC .................. *F16K 31/1221* (2013.01)
(58) Field of Classification Search
   CPC ................................................. F16K 31/122
   USPC ............................................. 251/61, 62, 63
   See application file for complete search history.

(56) References Cited

U.S. PATENT DOCUMENTS

| 3,310,282 | A | * | 3/1967 | Boteler | ................. | F16K 31/126 |
| | | | | | | 251/61.4 |
| 3,327,992 | A | * | 6/1967 | Nelson | .................... | F16K 41/04 |
| | | | | | | 251/270 |
| 3,521,674 | A | * | 7/1970 | Dodson | .............. | G01N 35/1097 |
| | | | | | | 137/625.48 |
| 3,874,629 | A | * | 4/1975 | Fontaine | ............... | F16K 31/365 |
| | | | | | | 251/61.4 |

(Continued)

FOREIGN PATENT DOCUMENTS

| DE | 102009023002 A1 | 12/2010 |
| DE | 202014102658 U1 | 6/2014 |

(Continued)

OTHER PUBLICATIONS

Translated EP extended search report, Application No. 24156655.3, dated Apr. 24, 2024, pp. 1-18.

(Continued)

*Primary Examiner* — Daphne M Barry
(74) *Attorney, Agent, or Firm* — BOND, SCHOENECK & KING, PLLC; George R. McGuire

(57) ABSTRACT

The invention relates to a valve actuator having an actuator housing and an actuator element, in particular a pneumatic piston or a control diaphragm, that is movably mounted within the actuator housing. In an assembly state of the valve actuator, at least one first contour of the actuator element engages in at least one second contour which is fixed relative to the actuator housing in such a way that a rotation of the actuator element about an actuating axis is blocked in at least one direction of rotation.

13 Claims, 12 Drawing Sheets

(56) References Cited

U.S. PATENT DOCUMENTS

| | | | | |
|---|---|---|---|---|
| 4,616,804 | A | * | 10/1986 | Sano .................. F16K 3/00 |
| | | | | 251/274 |
| 4,834,133 | A | * | 5/1989 | LaCoste .............. F16K 3/246 |
| | | | | 137/315.27 |
| 8,047,502 | B2 | | 11/2011 | Paffrath |
| 9,500,294 | B2 | * | 11/2016 | Herman ............ F16K 31/1225 |
| 9,970,567 | B2 | * | 5/2018 | Arnold .............. F16K 31/163 |
| 10,132,422 | B2 | | 11/2018 | McEvoy et al. |
| 10,337,639 | B2 | * | 7/2019 | Jackson ............ F16K 31/1264 |
| 10,837,576 | B2 | * | 11/2020 | Merscher ............ F16K 1/42 |
| 11,002,410 | B2 | * | 5/2021 | Frenal .............. F17C 13/025 |

FOREIGN PATENT DOCUMENTS

| | | |
|---|---|---|
| DE | 102014209186 A1 | 11/2015 |
| DE | 102015105489 A1 | 10/2016 |
| DE | 102016123606 A1 | 6/2018 |
| DE | 102018213712 A1 | 2/2020 |
| EP | 1970609 A1 | 9/2008 |
| EP | 2792918 A1 | 10/2014 |
| EP | 3287679 B1 | 5/2020 |
| JP | 2021046866 A | 3/2021 |
| KR | 101424423 B1 | 8/2014 |
| KR | 20190111933 A | 10/2019 |

OTHER PUBLICATIONS

European Search Report of Application 22185432.6, dated Jan. 2, 2023, pp. 1-9.
Search Report of German Application 10 2021 120 895.5, dated Jul. 14, 2021. pp. 1-9.

* cited by examiner

VALVE ACTUATOR, VALVE ASSEMBLY AND METHOD

CROSS-REFERENCE TO RELATED APPLICATION(S)

This application claims priority to German Patent Application No. 10 2021 120 895.5 filed with the German Patent Office on Aug. 11, 2021, the entirety of which is hereby incorporated by reference.

BACKGROUND

The invention relates to advances in the field of valve technology.

SUMMARY

The problems of the prior art are resolved by a valve actuator, a valve assembly and by a method.

A first aspect of the description relates to a valve actuator comprising an actuator housing and an actuator element, in particular a pneumatic piston, that is movably mounted within the actuator housing, wherein, in an assembly state of the valve actuator, at least one first contour of the actuator element engages in at least one second contour which is fixed relative to the actuator housing in such a way that rotation of the actuator element about an actuating axis is blocked by axial teeth in at least one direction of rotation.

Accordingly, a valve actuator is provided which allows assembly or disassembly of an element to be actuated, for example a valve rod for valves, in the assembly state on the actuator element without it being necessary to counteract an assembly or disassembly torque applied to the actuator element. In addition, the valve rod is quickly and easily connected to the actuator element without the need for additional tools.

An advantageous example is characterized in that the actuator element can be moved in a translational manner along the actuating axis and in a rotational manner about the actuating axis in an operating state different from the assembly state.

Consequently, the limitation of the rotational degree of freedom in the operating state is eliminated. For example, actuator drives that are held with a compression spring in a normally open or normally closed position benefit from this.

An advantageous example is characterized in that a compression spring braced against the actuator housing presses the actuator element in the direction of the contour which is fixed relative to the actuator housing.

Consequently, the valve actuator is in the assembly state without being driven or controlled separately, and the actuator element can be connected to the valve rod in this assembly state.

An advantageous example is characterized in that, in the assembly state, a valve rod and the actuator element can be connected to one another via mating threads.

Consequently, a uniform interface is provided which makes it possible to operate a variety of different valve bodies and valve types using the same type of actuator drive.

An advantageous example is characterized in that an intermediate body can be connected to one another by an interface arranged on the valve housing via mating threads.

Consequently, a uniform interface is provided which makes it possible to couple a variety of different valve bodies to the valve actuator via intermediate bodies which are adapted on the valve body side. Due to the uniformly designed interfaces of the actuator housing and the actuator element, this type of valve actuator is appropriate as an actuator unit for a variety of valves of different sizes, types or functions. Thus, valve devices which have a large number of identical parts can be configured in a modular manner in the form of the valve actuator. Accordingly, there are cost and production advantages, because the valve actuator can be produced in larger quantities.

An advantageous example is characterized in that the at least one second contour which is fixed relative to the actuator housing is arranged on a second portion extending in particular perpendicularly to the actuating axis within the actuator housing, and wherein the at least one first contour is arranged on a first portion of the actuator element extending in particular perpendicularly to the actuating axis and facing the second portion of the actuator housing.

Advantageously, the contours can thus be moved toward one another by an axial movement from an operating position and can engage in one another by rotation of the actuator element in the assembly position.

An advantageous example is characterized in that the first portion of the actuator element or the second portion of the actuator housing comprises surfaces which extend perpendicularly to the actuating axis and extend between two adjacent contours of the first contours or two adjacent contours of the second contours, and wherein the second contour or the first contour comprises an associated distal surface that is perpendicular to the actuating axis.

Before the assembly position is reached, the surfaces arranged between the associated contours ensure that the impinging contours of the opposite portion allow the actuator element to rotate until it latches in the assembly position.

An advantageous example is characterized in that one of the contours, the first contour of the actuator element or the second contour which is fixed relative to the actuator housing is formed as a latching recess and the other of the contours is formed as a raised latching lug. In an example that is not shown, the teeth can also be arranged radially instead of being axial teeth, i.e., they mesh in the axial direction.

Accordingly, the valve actuator allows the assembly state by means of a form-fitting engagement of space-saving, resilient contours in the form of axial teeth that withstand high shearing loads. In addition, noticeable haptic feedback is given to a user that is attributable to the engagement of the contours.

An advantageous example is characterized in that, in the assembly state, at least one contour, or better a plurality of contours, is/are engaged which is/are arranged symmetrically; 3 contours are advantageous.

Accordingly, the assembly or disassembly torque is better initiated and evenly distributed due to the arrangement or the symmetrical distribution at the engagement points.

A second aspect of the description relates to a valve assembly comprising the valve actuator according to the first aspect, wherein the valve actuator is connected to a valve.

A third aspect of the description relates to a method for assembling the valve actuator according to the first aspect on a valve, comprising: arranging a valve rod of the valve on the actuator element of the valve actuator in the assembly state; attaching an intermediate body of the valve to the actuator housing of the valve actuator; and arranging a valve body of the valve on the intermediate body.

DETAILED DESCRIPTION

Figure 1:
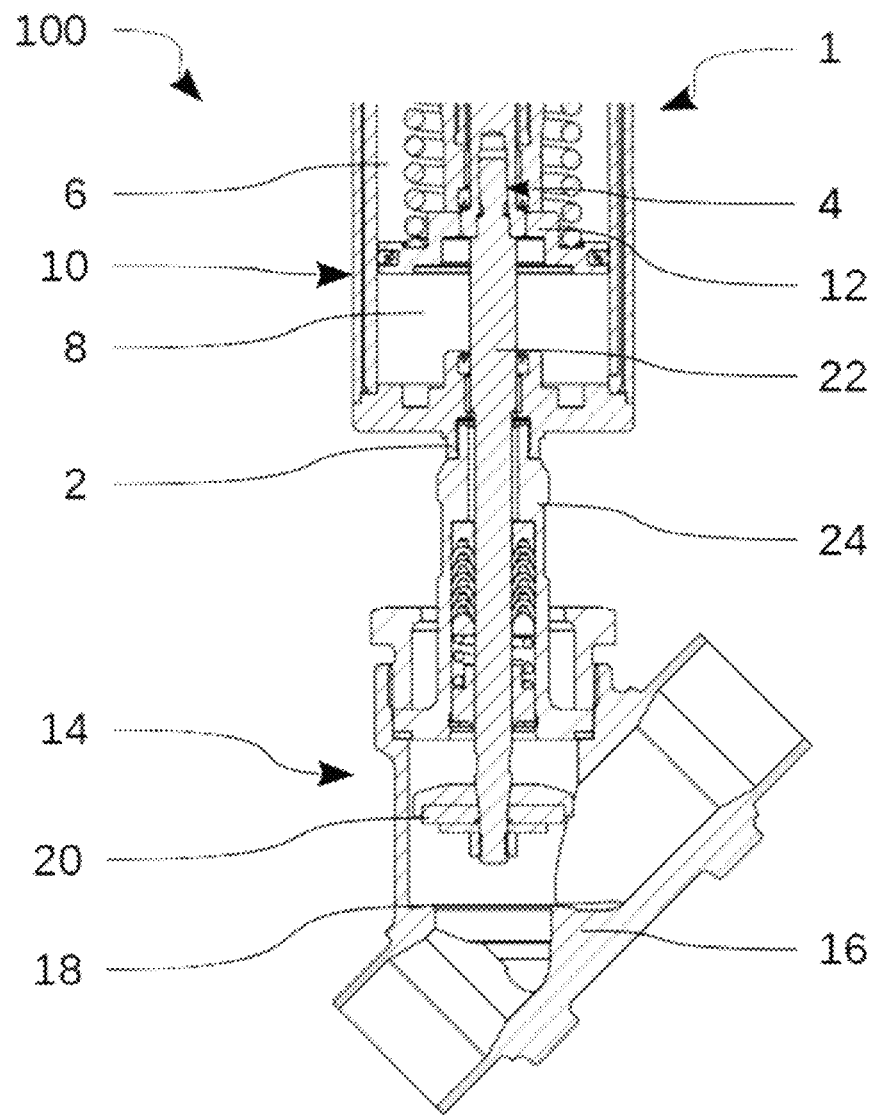
FIG. 1 shows a valve actuator for a seat valve.

FIG. 1 is a sectional view of a valve assembly 100. The valve assembly 100 comprises a valve actuator 1, which comprises an interface 2, a receiving device 4, the chambers 6 and 8, an actuator housing 10 and an actuator element 12, in particular a pneumatic piston. The receiving device 4 is arranged on the actuator element 12. The valve actuator 1 is designed as a fluid-based actuator which is driven by the chambers 6 and 8 being filled and emptied. Appropriate configuration of the actuator element 12 ensures that the chamber 8 facing away from the spring has a reduced volume of control air, which has the advantage of low compressed air consumption and thus increases efficiency. The outer region of the actuator element 12 facing away from a spring is arranged offset from the inner connection region, pointing away from a spring, in order to reduce the volume of control air and to reach the latching position more easily. In other words, the piston 12 has a stepped design and comprises a bearing point in the region of a closing element, which is identified below with the reference number 304. Driving the valve actuator 1 causes the actuator element 12 to move within the actuator housing 10. Other actuator drive concepts such as electromagnetic drive technologies are of course also conceivable.

Of course, the actuator element 12 can also be designed differently from what is shown in FIG. 1. For example, the actuator element 12 can also comprise a control diaphragm that is part of a diaphragm actuator drive.

In an example that is not shown, the actuator element 12 is mirrored in the region of the closing element on a perpendicular plane of an actuating axis 310. The gradation of the actuator element 12 tapers in the direction of the valve body. In this normally open actuator drive, the spring braces against a portion of the chamber 8 facing the valve body and pushes the actuator element 12 away from the valve body.

Furthermore, the valve assembly 100 comprises a seat valve 14 which comprises a valve housing 16, a valve seat 18 and a closing element 20. A valve rod 22 arranged on the receiving device 4 produces a rigid connection between the valve actuator 1 and the closing element 20 of the seat valve 14. The valve housing 16 of the seat valve 14 is connected to the valve actuator 1 by means of an intermediate body 24 arranged at the interface 2. Due to the rigid connection of the actuator element 12 to the closing element 20 by means of the valve rod 22, the movement of the actuator element 12 is transmitted to the closing element 20. As a result, the valve seat 18 is opened or closed and a flow through the valve housing 16 is controlled.

The receiving device 4 and the interface 2 of the valve actuator 1 can in particular be formed as threads. Accordingly, the valve rod 22 and the intermediate body 24 also have threads on the actuator drive side.

Figure 2:
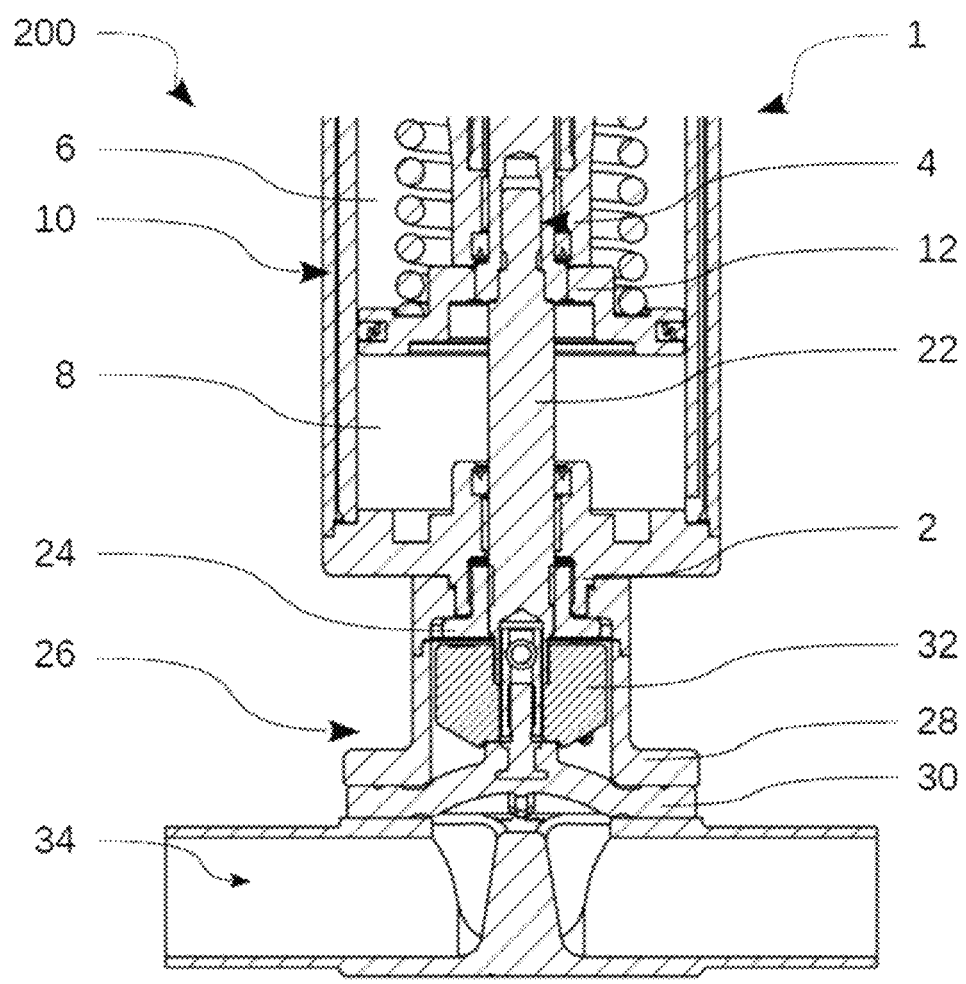
FIG. 2 shows the valve actuator for a diaphragm valve.

FIG. 2 is a sectional view of a further valve assembly 200. The valve assembly 200 comprises the valve actuator 1 of FIG. 1. In contrast to FIG. 1, the valve assembly 200 comprises a diaphragm valve 26 which comprises a valve body, an intermediate piece 28, a diaphragm 30 and a pressure piece 32. The diaphragm valve 26 is connected to the interface 2 of the valve actuator 1 by means of the intermediate body 24. The valve rod 22 forms a rigid connection between the actuator element 12 and the diaphragm 30. Driving the valve actuator 1 moves the actuator element 12 and the diaphragm 30 that is coupled to the actuator element 12 via the valve rod 22. As a result, a flow through a line 34 can be controlled by means of the valve actuator 1.

The valve rods in FIGS. 1 and 2 are of identical design on the actuator drive side so that they can be arranged on the receiving device 4 of the actuator element 12. The valve rods 22 differ only in a valve-side portion. This valve-side portion is designed to be arranged on a corresponding valve on a sealing element that is to be moved of the valve, for example, as illustrated in FIGS. 1 and 2, in order to be able to be attached to the closing element 20 or to the diaphragm 30.

The intermediate bodies 24 in FIGS. 1 and 2 are of identical design, at least on the actuator drive side, so that the intermediate body 24 can be arranged at the interface 2 of the valve actuator 1, and they differ in a valve-side portion. This valve-side portion is designed to receive corresponding valves or valve bodies, such as the valve body 16 and the intermediate body 28, and thus to connect them to the interface 2 of the valve actuator 1.

By using valve rods 22 and intermediate bodies 24 of identical design on the actuator drive side, a variety of valve devices, such as the valve assembly 100 and 200, can be constructed modularly with an identically or similarly designed actuator drive, the valve actuator 1. The valve rod 22 and the intermediate body 24, which are each adapted to the valve on the valve side, are required. As a result, valve units having valves of different types, functions and sizes can be driven with a uniform actuator drive, the valve actuator 1. Thus, the variety of modularly constructed valve devices contains a large number of identical parts in the form of the uniform valve actuator 1. Accordingly, there are cost and production advantages because the valve actuator 1 can be produced in larger quantities.

Figure 3:
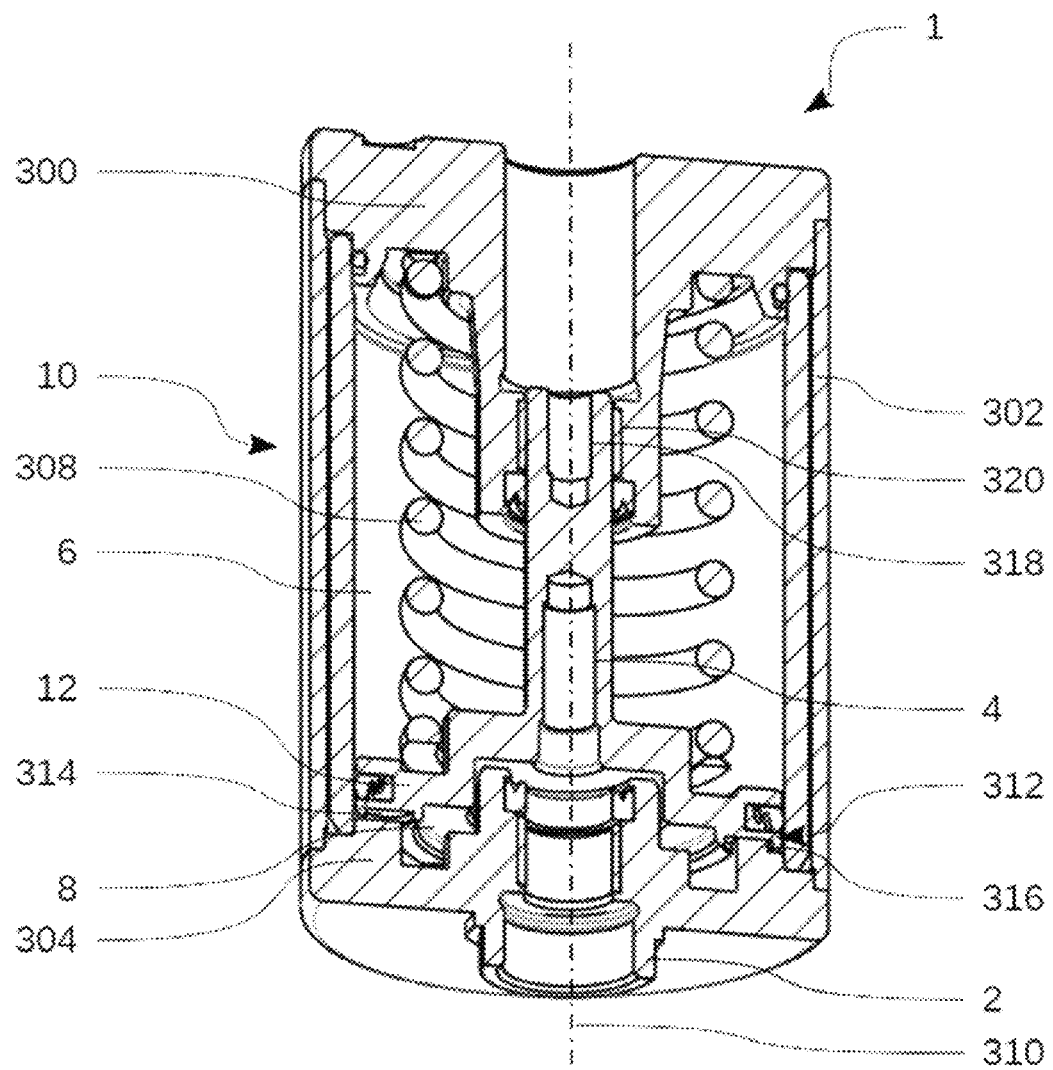
FIG. 3 shows the valve actuator.

FIG. 3 is a sectional view of the valve actuator 1 in the assembly state. The valve actuator 1 comprises the actuator housing 10, which comprises a distal closing element 300, a wall 302 and a closing element 304 on the valve body side. In addition, the valve actuator 1 comprises the actuator element 12, which is mounted movably along an actuating axis 310 and is arranged between the closing elements 300 and 304, and a compression spring 308, which is arranged between the actuator element 12 and the distal closing element 300. The closing elements 300 and 304, the wall 302 and the actuator element 12 are designed in particular to be rotationally symmetrical. The axes of symmetry of these elements are arranged along the actuating axis 310. In an operating state in which the valve actuator 1 is operated with compressed air, the actuator element 12 can be moved in rotation along the actuating axis 310 and in translation relative to the fixed closing elements 300 and 304 and to the wall 302, i.e., to the actuator housing 10. In the operating state, the actuator element 12 can assume a plurality of operating positions.

The compression spring 308 holds the actuator element 12 in a possible extended position by a spring force if the valve actuator 1 is not actuated accordingly. It is also conceivable that the compression spring 308 is arranged between the actuator element 12 and the closing element 304 on the valve body side and holds the actuator element 12 in a possible retracted position if the valve actuator 1 is not actuated accordingly.

In the position of the valve actuator 1 shown in FIG. 3, a fixing device 312 blocks the rotational degree of freedom of the actuator element 12 about the actuating axis 310. This extended position is referred to as the assembly position. The fixing device 312 comprises first contours 314 arranged on a side of the actuator element 12 facing toward the closing element 304 on the valve body side, in this case these contours being formed as latching recesses. On a side of the closing element 304 on the valve body side facing the actuator element 12, second contours 316, in particular latching lugs, are fixed relative to the actuator housing 10 and engage with the first contours 314 in a form-fitting manner in the assembly position. However, other form-fitting connections representing the fixing device 312 and its function—for example tongue and groove, radially extending contours or teeth that engage with one another—are also conceivable. In addition, it is also conceivable to arrange the fixing device 312 between the actuator element 12 and the distal closing element 300.

Advantageously, the compression spring 308 is designed to hold the actuator element 12 in a position in which the valve body side of the piston can slide on surfaces which are arranged between the second contours 316 that are fixed relative to the actuator housing 10. During this rotation of the actuator element 12 that occurs about the actuating axis 310, for example during assembly or disassembly of a valve rod 22, the actuator element 12 is moved into the assembly position. This has the effect that the first contours 314 are engaged in a form-fitting manner with the second contours 316 which are fixed relative to the actuator housing 10, and block the rotation of the actuator element 12 about the actuating axis 310 in both directions of rotation. The first contours 314 and the second contours 316 form the fixing device 312. Furthermore, the compression spring 308 is also designed to hold the actuator element 12 in the assembly position it has reached. In addition, when the fixing device 312 engages, a haptically noticeable feedback is given to the user.

In an example that is not shown, the contours 314, 316 that engage with one another are designed in such a way that the actuator element can no longer be released via the latching mechanism, for example the contours 314, 316 are chamfered on one side for the latching mechanism.

The rotational degree of freedom of the actuator element 12 about the actuating axis 310, which is blocked by means of the fixing device 312 in the assembly position, renders it no longer necessary to counteract the actuator element 12 against a tightening or assembly torque of the valve rod 22 during assembly or disassembly of, for example, the valve rod 22 for seat valves or diaphragm valves 14 and 26. In addition, the valve rod 22 of the valve to be actuated can easily and quickly be connected to the valve actuator 1 in the assembly position without the need for additional tools.

In addition, the actuator element 12 comprises a further receptacle 318 which is arranged in a region of the actuator element 12 that faces the distal end element 300. The receptacle 318 is designed to receive, for example, an element of a signal transmitter that serves as a position indicator for the current position of the actuator element 12. The receptacle 318 is represented by threads, for example. Of course, other connection techniques, such as clip connections, bayonet locks, adhesive connections or integral connections are also conceivable.

Figure 4:
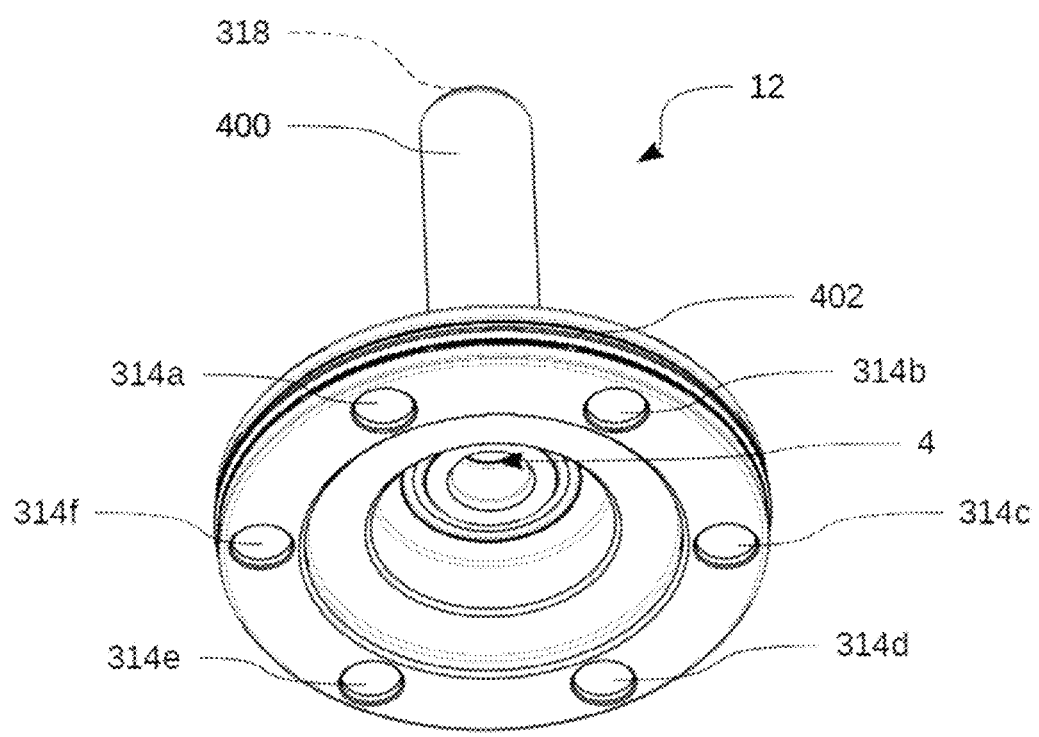
FIG. 4 shows an actuator element of the valve actuator.

FIG. 4 is a perspective view of the actuator element 12 of the valve actuator 1. For the receiving device 4 and the receptacle option 318, the actuator element 12 comprises a guide portion 400 mounted in a sealing portion 320 of the distal closing element. The sealing portion 320, in combination with the guide portion 400, allows a radially guided movement of the actuator element 12 in rotation about and in translation along the actuating axis 310. In addition, the actuator element 12 comprises the first contour 314 in the form of latching recesses 314 a-f or an alternative contour, not shown, which represents part of the fixing device 312 of the valve actuator 1.

It is also conceivable, in a form that is not shown, to create the fixation device 312 by two contours engaging outside of the chambers 6 and 8, for example by a first contour arranged on the guide portion 400 of the actuator element 12 and a second contour arranged on the distal closing element 302 in the region of the sealing portion 320 or outside of the sealing portion 320.

In addition, the actuator element 12 comprises a sealing portion 402 arranged on the circumference, which is in contact with the wall profile 302 and thereby separates the chambers 6 and 8. In addition, the sealing portion 402, in conjunction with the wall profile 302, is also used for mounting the actuator element 12.

Due to the guide portion 400 mounted in the sealing portion 320, a significantly more stable construction of the valve actuator 1 is created and a function is ensured even under higher loads. However, other concepts are conceivable which improve the mounting of the actuator element 12, for example the use of an actuator element 12 that expands to a greater extent along the actuating axis 310 and has a wider sealing portion 402, which restricts the tilting of the actuator element 12.

Figure 5:
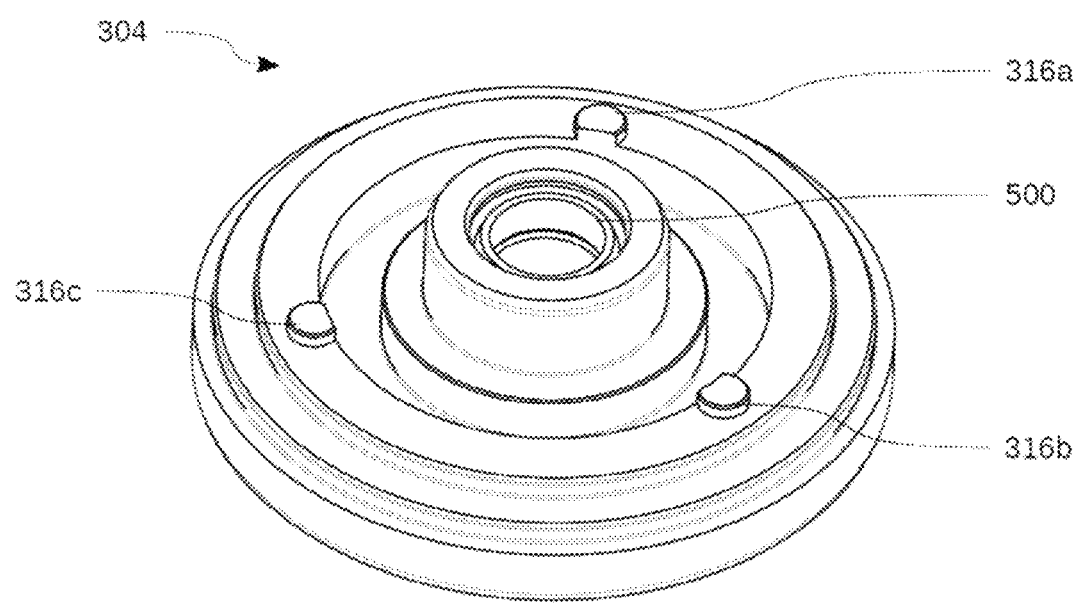
FIG. 5 shows a valve-body-side closing element of the valve actuator.

FIG. 5 is a perspective view of the closing element 304 of the valve actuator 1 on the valve body side. The closing element 304 on the valve body side comprises the second contour 316, in the form of latching lugs 316 a-c, which is fixed relative to the actuator housing 10, or alternative contours that represent part of the fixing device 312 of the valve actuator 1. In an advantageous embodiment, the closing element 304 on the valve body side has an odd number of latching lugs 316-c. As a result, an assembly or disassembly torque is better initiated in the assembly position. Of course, an even number of latching lugs can also be provided.

One example is characterized by the number of latching lugs 316 a-c of the closing element 304 on the valve body side and the number of latching lugs 314 a-f of the piston 306, or alternatively the number of possible contours, such as tongue and groove, radially extending contours or teeth, that engage with one another being different. The number and positioning of the engaging contours is designed in such a way that the fixing device 312 allows the assembly position of the valve actuator 1 to be reached. The closing element 304 on the valve body side also comprises a through opening 500 for the valve rod 22, for example for the coupling element for seat valves or diaphragm valves 14 and 26. This through-opening 500 is also used for mounting the coupling element 22. As a result, the valve rod 22 is also mounted in addition to the receiving device 4. This results in a more stable construction of the valve assembly 100 and 200, which has an increased service life and withstands higher loads.

Figure 6:
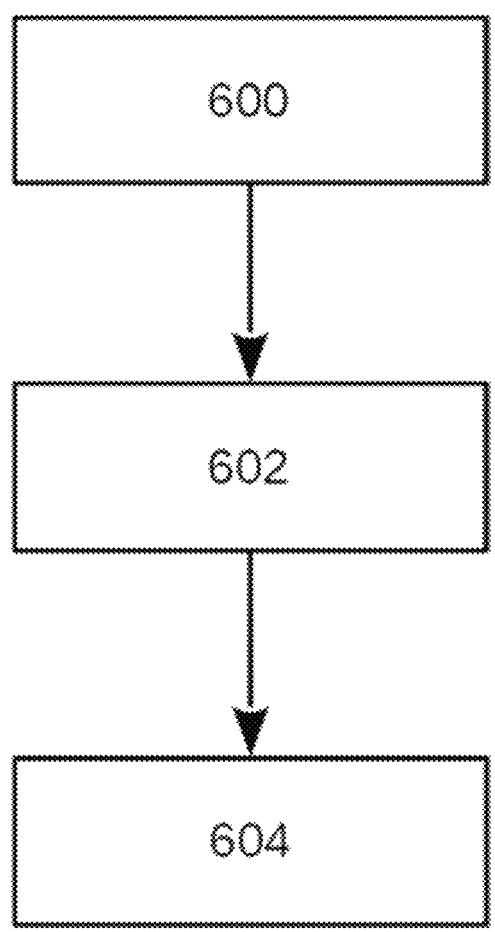
FIG. 6 is a schematic flow diagram.

FIG. 6 schematically shows a method for assembling the valve actuator 1 on a valve 14 or 26 in order to obtain the valve assembly 100 and 200. In a first step 600, the valve rod 22 of the valve 14 and 26 is arranged on the actuator element 12 of the valve actuator 1 by means of the receiving device 4. In a second step 602, the intermediate body 24 is attached to the interface 2 of the closing element 304 on the valve side. In a third step, the valve body 16 or the intermediate body 28 of the valve 14 or 26 is arranged on the intermediate body 24. Of course, the method steps 600, 602 and 604 can also be used for the assembly of a variety of valve assemblies having different valve types and valve sizes.

Figure 7:
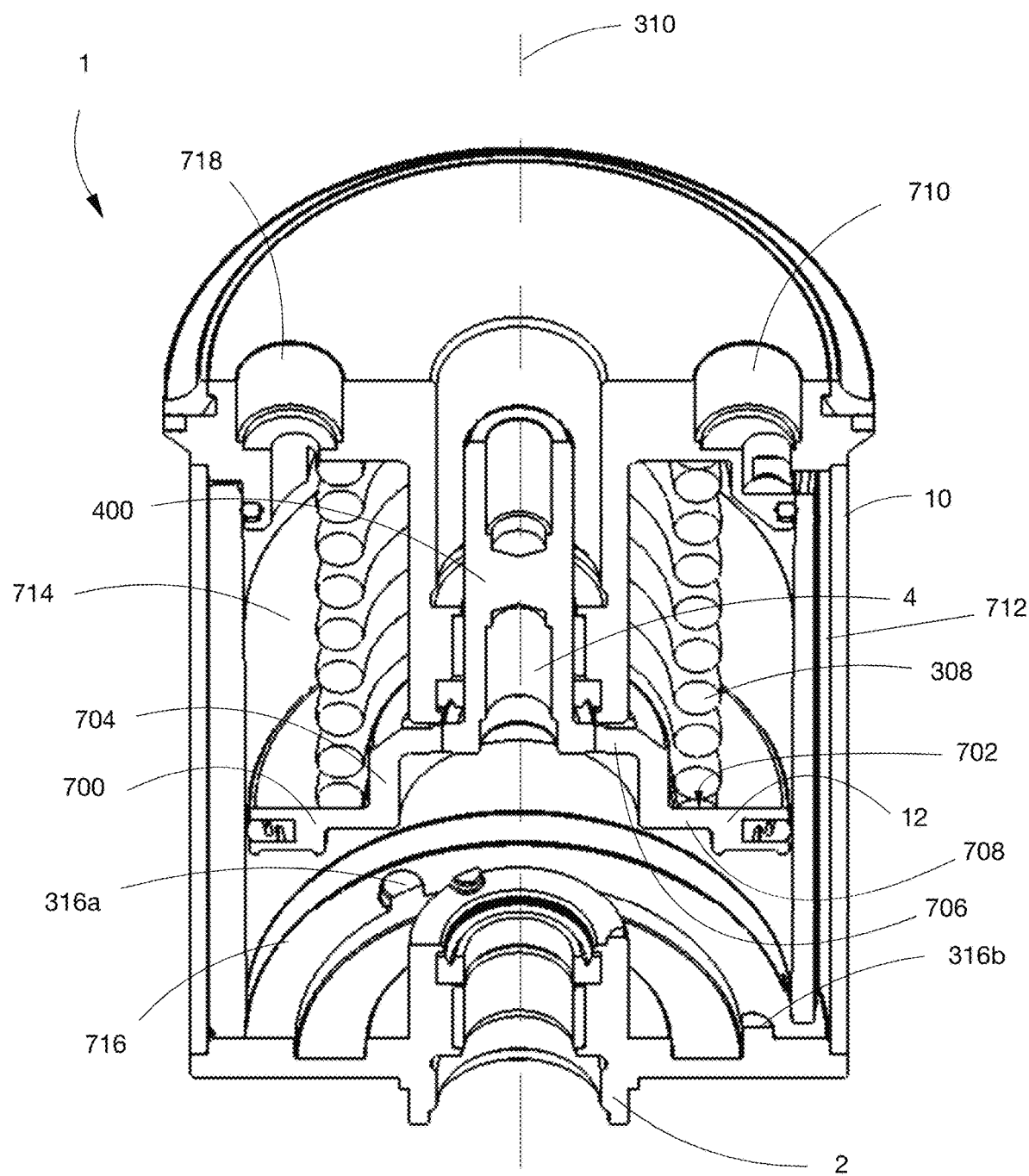
FIGS. 7 and 8 show an example of the valve actuator for a normally closed valve assembly.
Figure 8:
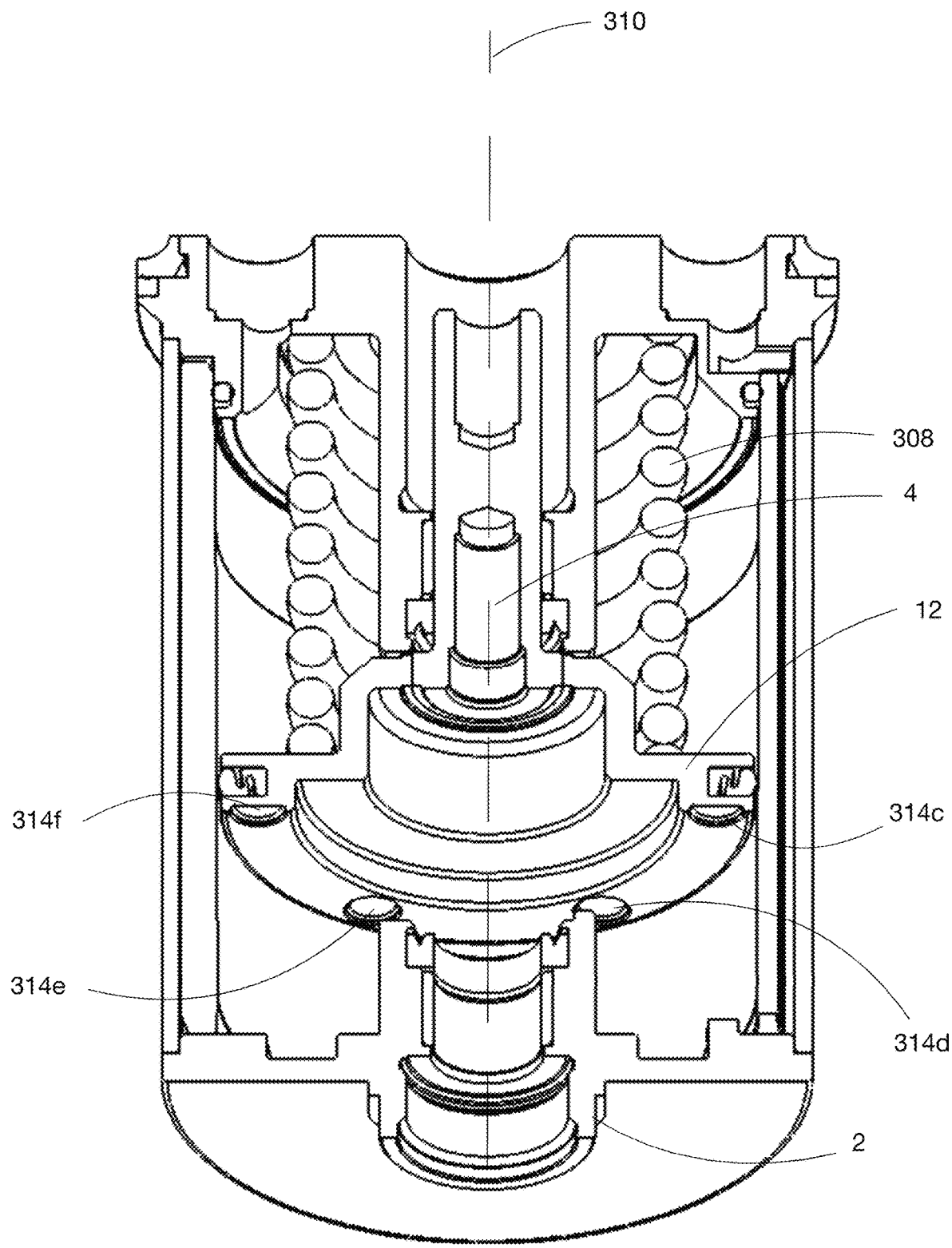

FIGS. 7 and 8 show an example of the actuator drive 1 from FIGS. 1 to 3, wherein the actuator element 12 is in the operating position. The actuator element 12 comprises the guide portion 400 and a piston portion 700 which is integrally connected to the guide portion 400. For example, the guide portion 400 and the piston portion 700 are welded to one another. A resting position of the actuator element 12 is characterized in that the compression spring 308 has a maximum longitudinal extent when the actuator drive 1 is in the mounted state. In the example shown, the resting position of the actuator element 12 is oriented in the direction of the valve body (not shown) or in the direction of the interface 2. The compression spring 308 therefore presses the actuator element 12 in the direction of the interface 2.

The guide portion 400 is movably mounted to the actuator housing 10 along the actuating axis 310. The piston portion 700 connects radially outward to the guide portion 400 and provides the seal toward the cylinder inner surface.

A counter bearing portion 702 provides a contact surface for the compression spring 308 which braces against the housing 10. A cylindrical portion 704 of the piston portion 700 extends parallel to the actuating axis 310 and provides a radially outer surface to receive the compression spring 308.

A first collar 706 of the piston portion 700 protrudes from the cylindrical portion 704 in the direction of the guide portion 400 and is integrally connected thereto. A second collar 708 of the piston portion 700 protrudes outward from the cylindrical portion 704.

A first actuating fluid interface 710 is connected to a first chamber 716 in a fluid-conducting manner via a lateral channel 712 of the actuator housing 10. The channel 712 leads past a second chamber 714 in which the compression spring 308 is arranged. The chambers 714 and 716 are separated from one another in a pressure-tight manner by the actuator element 12.

A second actuating fluid interface 718 is connected to the second chamber 714 in a fluid-conducting manner.

Figure 9:
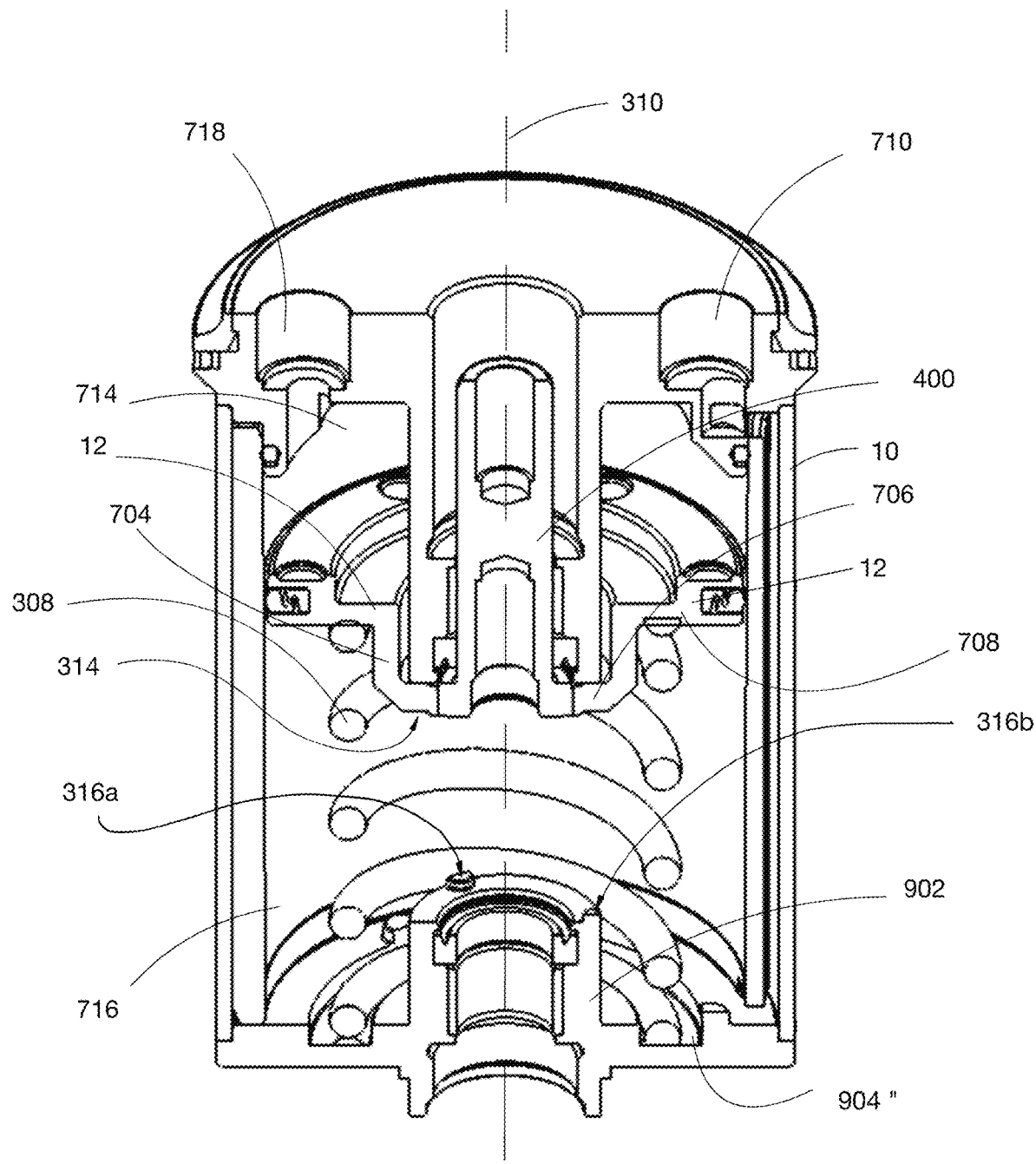
FIGS. 9 and 10 show an example of the valve actuator for a normally open valve assembly.
Figure 10:
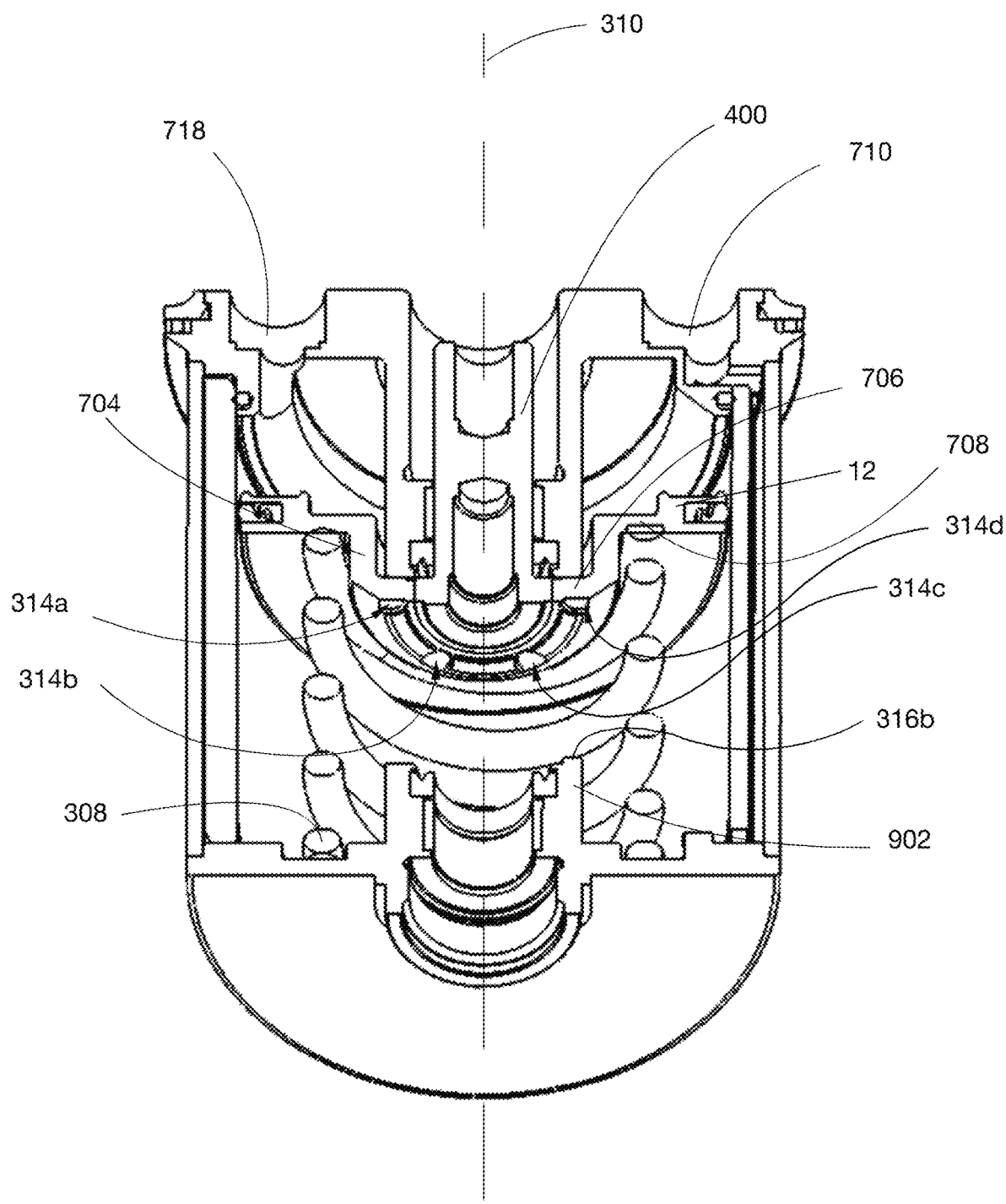

FIGS. 9 and 10 show a further example of the actuator drive 1. Deviating from the example of FIGS. 7 and 8, the resting position of the actuator element 12 faces away from the valve body (not shown) or from the interface 2. The compression spring 308 therefore presses the actuator element 12 away from the interface 2.

In contrast to the example from FIGS. 7 and 8, the piston portion 700 is rigidly connected, in particular integrally, to the guide portion 400 in a position that is mirror-symmetrical with respect to a line perpendicular to the actuating axis 310. The guide portion 400 and the piston portion 700 are designed the same as in the example of FIGS. 7 and 8. However, the active contours for blocking the rotation of the actuator element 12 are arranged at a different place.

For a better overview, FIGS. 9 and 10 show the actuator element 12 in an intermediate position along the actuating axis 310. In the assembly state of the valve actuator 1, the at least one first contour 314 of the actuator element 12 arranged on the collar 706 of the piston portion 700 engages in the at least one second contour 316 which is fixed relative to the actuator housing 10 in such a way that rotation of the actuator element 12 about the actuating axis 310 is blocked in at least one direction of rotation. The fixed contours 316a, 316b are arranged at the distal end of a portion 902 which extends cylindrically from the bottom of the interior space in the direction of the actuator element 12.

An annular groove 904 in the closing element 304 on the valve body side serves as a counter support for the compression spring 308, which support is fixed relative to the actuator housing 10.

Due to the radially different positions of the associated active contours 314 and 316, a modular system is created which reduces the complexity of the parts. In order to implement one or the other control function, the actuator element 12 is put together differently. In an implementation of a normally closed valve according to FIGS. 7 and 8, the active contours 314, 316 are arranged radially outside the compression spring 308 or a notional cylindrical extension of the compression spring 308. In an implementation of a normally open valve according to FIGS. 9 and 10, the active contours 316, 314 are arranged radially inside the compression spring 308.

Figure 11:
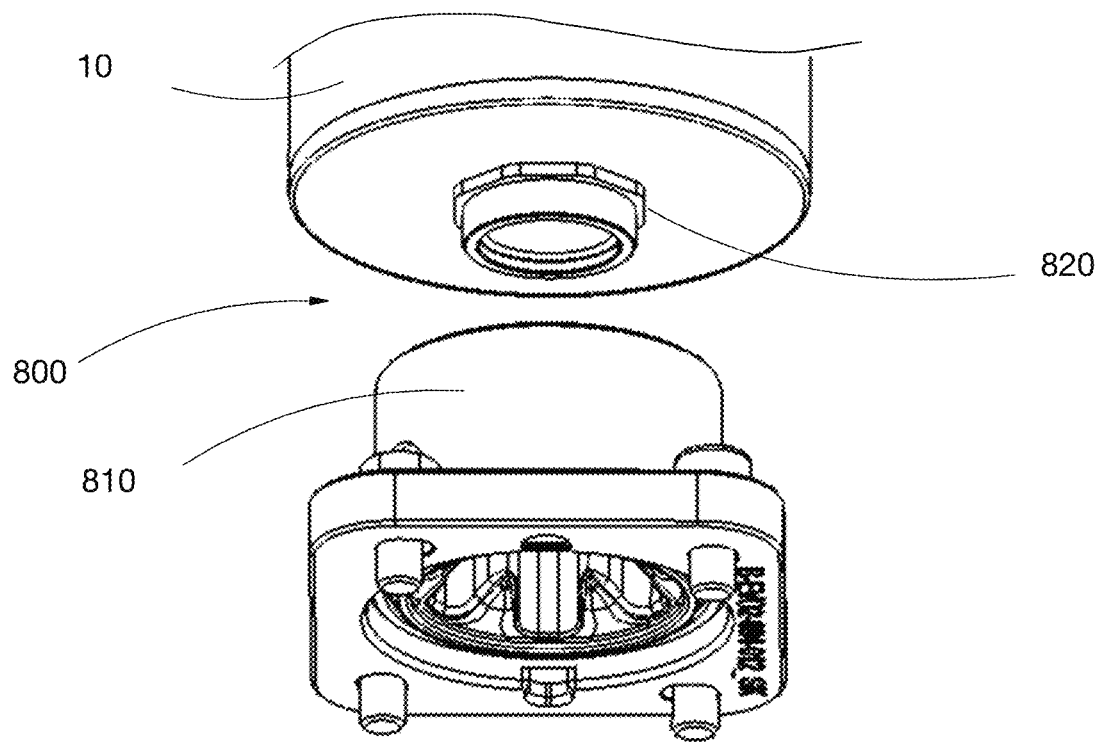
FIGS. 11 and 12 show an example of an interface between an actuator body and an intermediate body.
Figure 12:
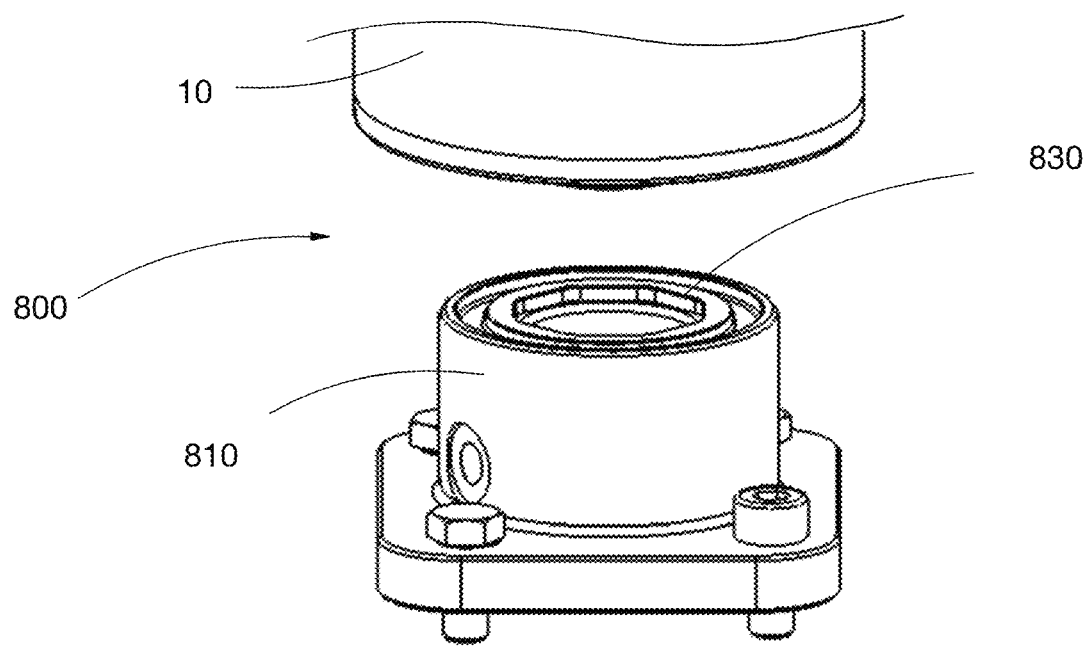

FIGS. 11 and 12 are perspective views of an example of an interface 800 between the actuator housing 10 and an intermediate body 810. The intermediate body 810 is arranged between the actuator housing 10 and the valve body 16. The interface 800 comprises an actuator-body-side coded portion 820 and an intermediate-body-side coded mating portion 830. The portion 820 and the mating portion 830 can be fixed relative to one another in a plurality of rotational positions by the portions 820 and 830 engaging in one another in a form-fitting manner, which, for example, results in advantages for the arrangement of connections deflecting laterally from the actuator housing 10. This results in degrees of freedom for the assembly.

Figure 13:
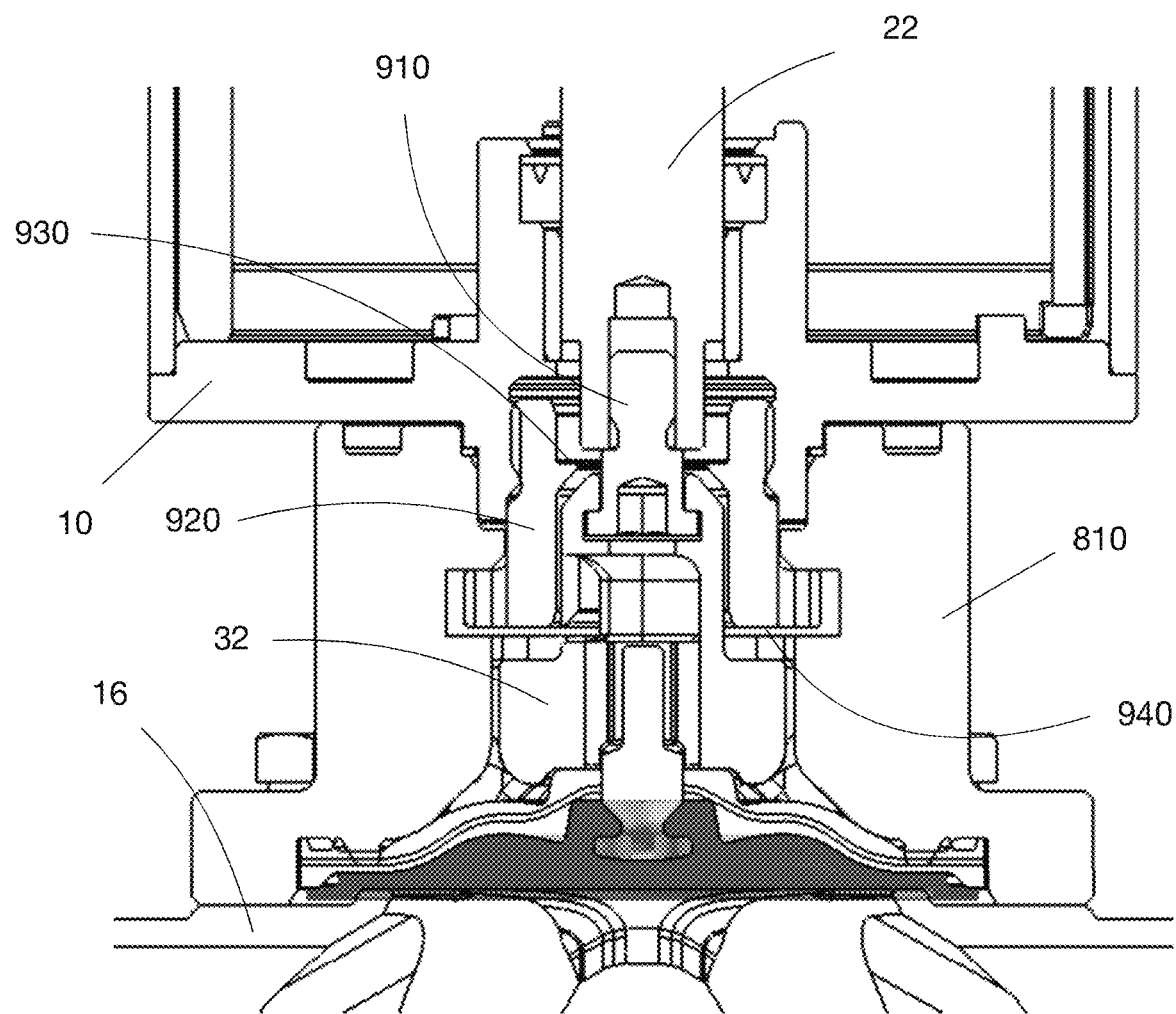
FIG. 13 shows an example of a stroke limiter.

FIG. 13 shows a schematic longitudinal section of the actuator housing 10, the intermediate body 810 and the valve body 16. An adapter 910 is introduced into the valve rod 22. On the valve body side, the adapter 910 comprises a connection into which the pressure piece 32 is suspended, in particular laterally. A stroke limiter 920 extends, starting from the interior space of the intermediate body 810, into a recess in the actuator housing 10. An abutment region 930 of the stroke limiter 920 oriented in the direction of the actuator body 10 limits a movement of the valve rod 22 in the direction of the valve body 16. An abutment region 940 oriented in the direction of the valve body 16 limits a movement of the pressure piece 32 in the direction of the actuator body 10.

The invention claimed is:

1. A valve actuator comprising an actuator housing and an actuator element wherein the actuator element is moveable in a translational manner along the actuating axis and in a rotational manner about the actuating axis in an operating state different from an assembly state, wherein the actuator element is movably mounted within the actuator housing, wherein in the assembly state of the valve actuator, at least one first contour of the actuator element engages in at least one second contour, wherein the at least one second contour is fixed relative to the actuator housing in such a way that rotation of the actuator element about an actuating axis is blocked in at least one direction of rotation, and wherein one of the at least one first contours is formed as a latching recess and the at least one second contour is formed as a latching lug, or wherein one of the at least one first contour is formed as a latching lug and the at least one second contour is formed as a latching recess.

2. The valve actuator according to claim 1, wherein a compression spring that braces against the actuator housing presses the actuator element in the direction of the at least one second contour, wherein the at least one second contour is fixed relative to the actuator housing.

3. The valve actuator according to claim 1, wherein in the assembly state, a valve rod and the actuator element is connectable-to one another via mating threads.

4. The valve actuator according to claim 1, wherein an intermediate body is connectable to an interface arranged on the valve housing via mating threads.

5. The valve actuator according to claim 1, wherein the at least one second contour which is fixed relative to the actuator housing is arranged on a second portion extending perpendicularly to the actuating axis within the actuator housing, and wherein the at least one first contour is arranged on a first portion of the actuator element which extends perpendicularly to the actuating axis and faces the second portion of the actuator housing.

6. The valve actuator according to claim 5, wherein the first portion of the actuator element or the second portion of the actuator housing comprises surfaces which extend perpendicularly to the actuating axis and extend between two adjacent contours of the at least one first contours or two adjacent contours of the at least one second contours, and wherein the at least one second contour or the at least one first contour comprises an associated distal surface that is perpendicular to the actuating axis.

7. The valve actuator according to claim 1, wherein, in the assembly state, the at least one first contour and the at least one second contour are in engagement.

8. The valve actuator according to claim 1, wherein the actuator element comprises a guide portion and a piston portion which is rigidly connected to the guide portion.

9. The valve actuator according to claim 8, wherein the at least one first contour, which cooperates with the at least one fixed second contour, is located radially outside a notional extension of the compression spring.

10. The valve actuator according to claim 8, wherein the at least one first contour, which cooperates with the at least one fixed second contour, is located radially inside a notional extension of the compression spring.

11. A valve assembly comprising a valve actuator comprising an actuator housing and an actuator element, wherein the actuator element is moveable in a translational manner along the actuating axis and in a rotational manner about the actuating axis in an operating state different from an assembly state, wherein the actuator element is movably mounted within the actuator housing, wherein in an assembly state of the valve actuator, at least one first contour of the actuator element engages in at least one second contour, wherein the at least one second contour is fixed relative to the actuator housing in such a way that rotation of the actuator element about an actuating axis is blocked in at least one direction of rotation, wherein one of the at least one first contours is formed as a latching recess and the at least one second contour is formed as a latching lug, or wherein one of the at least one first contour is formed as a latching lug and the at least one second contour is formed as a latching recess, and wherein the valve actuator is connected to a valve.

12. A method for assembling a valve actuator comprising an actuator housing and an actuator element wherein the actuator element is moveable in a translational manner along the actuating axis and in a rotational manner about the actuating axis in an operating state different from an assembly state, wherein the actuator element is movably mounted within the actuator housing, wherein in an assembly state of the valve actuator, at least one first contour of the actuator element engages in at least one second contour, wherein the at least one second contour is fixed relative to the actuator housing in such a way that rotation of the actuator element about an actuating axis is blocked in at least one direction of rotation, and wherein one of the at least one first contours is formed as a latching recess and the at least one second contour is formed as a latching lug, or wherein one of the at least one first contour is formed as a latching lug and the at least one second contour is formed as a latching recess, comprising the steps of:

arranging a valve rod of the valve on the actuator element of the valve actuator in the assembly state;

attaching an intermediate body of the valve to the actuator housing of the valve actuator; and arranging a valve body of the valve on the intermediate body.

13. A valve actuator comprising an actuator housing and an actuator element wherein the actuator element is moveable in a translational manner along the actuating axis and in a rotational manner about the actuating axis in an operating state different from an assembly state, wherein the actuator element is movably mounted within the actuator housing, wherein in the assembly state of the valve actuator, at least one first contour of the actuator element engages in at least one second contour, wherein the at least one second contour is fixed relative to the actuator housing in such a way that rotation of the actuator element about an actuating axis is blocked in at least one direction of rotation, wherein the actuator element comprises a guide portion and a piston portion which is rigidly connected to the guide portion, and wherein the at least one first contour, which cooperates with the at least one fixed second contour, is located radially inside a notional extension of the compression spring.

* * * * *